US007530722B2

(12) United States Patent
Murai

(10) Patent No.: US 7,530,722 B2
(45) Date of Patent: May 12, 2009

(54) ILLUMINATION DEVICE, ELECTRO-OPTICAL DEVICE, AND ELECTRONIC APPARATUS

(75) Inventor: Ichiro Murai, Chino (JP)

(73) Assignee: Epson Imaging Devices Corporation (JP)

(*) Notice: Subject to any disclaimer, the term of this patent is extended or adjusted under 35 U.S.C. 154(b) by 317 days.

(21) Appl. No.: 11/532,600

(22) Filed: Sep. 18, 2006

(65) Prior Publication Data

US 2007/0064422 A1 Mar. 22, 2007

(30) Foreign Application Priority Data

Sep. 20, 2005 (JP) ............................ 2005-272028
Oct. 18, 2005 (JP) ............................ 2005-302963

(51) Int. Cl.
*F21V 7/04* (2006.01)
*G02F 1/1335* (2006.01)
*G09G 3/36* (2006.01)

(52) U.S. Cl. ........................ 362/613; 362/231; 349/68; 345/102

(58) Field of Classification Search ......... 362/611–613; 349/61, 68, 199; 345/82–84, 102
See application file for complete search history.

(56) References Cited

U.S. PATENT DOCUMENTS 6,357,889 B1 * 3/2002 Duggal et al. ................. 362/84
6,914,250 B2 * 7/2005 Seville .................... 250/458.1
6,917,354 B2 * 7/2005 Fujishiro et al. ............ 345/102
7,002,546 B1 * 2/2006 Stuppi et al. ................ 345/102
7,009,343 B2 3/2006 Lim et al.
7,193,356 B2 * 3/2007 Kokubo et al. .............. 313/495
7,256,557 B2 8/2007 Lim et al.
7,301,523 B2 * 11/2007 Kamei ........................ 345/102
2003/0030371 A1 * 2/2003 Liao et al. ................... 313/506
2003/0173525 A1 * 9/2003 Seville .................... 250/458.1
2004/0052076 A1 * 3/2004 Mueller et al. .............. 362/293
2004/0246435 A1 * 12/2004 Kamei ........................ 349/199
2006/0033860 A1 * 2/2006 Okishiro et al. ............... 349/70
2006/0125773 A1 * 6/2006 Ichikawa et al. ............ 345/102

FOREIGN PATENT DOCUMENTS

| | | |
|---|---|---|
| JP | 2000-206486 | 7/2000 |
| JP | 2004-093629 | 3/2004 |
| JP | 2004-093761 | 3/2004 |
| JP | 2005-049791 | 2/2005 |
| JP | 2005-056842 | 3/2005 |
| JP | 2005-234132 | 9/2005 |
| JP | 2005-259699 | 9/2005 |

* cited by examiner

*Primary Examiner*—Ali Alavi
(74) *Attorney, Agent, or Firm*—Harness, Dickey & Pierce, P.L.C.

(57) ABSTRACT

An electro-optical device includes a display panel, and an illumination device having a plurality of light sources emitting light of red, green, blue, and white. The illumination device is configured to illuminate the display panel by transmitting the light emitted from the plurality of light sources through the display panel. The chromaticity of a display screen of the display panel is adjusted to a predetermined chromaticity by changing the time for which each of the plurality of light sources is turned on within a time period of one frame.

20 Claims, 11 Drawing Sheets

ILLUMINATION DEVICE, ELECTRO-OPTICAL DEVICE, AND ELECTRONIC APPARATUS

BACKGROUND

1. Technical Field

The present invention relates to an illumination device used in an electro-optical device such as a liquid crystal display device.

2. Related Art

An electro-optical device, such as a liquid crystal display device, allows color display by using an illumination device that emits white light, and a display panel equipped with three color filters of red (R), green (G), and blue (B), such as a liquid crystal display panel. The illumination device transmits the emitted white light through the display panel to illuminate the display panel. Such an illumination device includes a plurality of light sources for emitting light of RGB colors, such as light emitting diodes (LEDs). The illumination device emits white light by combining the RGB light emitted from these light sources.

However, if LEDs are used as light sources and are turned on by causing a constant current to flow through the LEDs, heat loss occurs in the LEDs. The heat loss may reduce the life of the LEDs. JP-A-2004-93761 discloses a technique in which LEDs for RGB colors used as light sources of an illumination device are illuminated on a time-division basis, thereby reducing the power consumption and extending the life of the LEDs.

When illumination devices are combined with display panels to form electro-optical devices, in even the same illumination device, different color reproduction regions on the display screen are obtained depending on the display panels used with the illumination devices. In order to realize a desired color reproduction region on the display screen, it is necessary to adjust the illumination colors of the illumination device in consideration of the characteristics of the display panel. JP-A-2004-93629 discloses a technique in which the pulse width of a current flowing through each of LEDs for RGB colors to illuminate the LEDs on a time-division basis is changed, thereby adjusting the chromaticity on the display screen. JP-A-2005-56842 discloses an assembly having both an LED for emitting white light and an LED for a low-brightness light color, in which the color production on the display screen is improved.

SUMMARY

An advantage of the invention is that it provides an electro-optical device including a display panel and a illumination device, in which a desired color reproduction region is realized on the display screen and the power consumption is reduced.

According to an aspect of the invention, an electro-optical device includes a display panel, and an illumination device having a plurality of light sources emitting light of red (R), green (G), blue (B), and white (W). The illumination device is configured to illuminate the display panel by transmitting the light emitted from the plurality of light sources through the display panel. The chromaticity of the display panel is adjusted to a predetermined chromaticity by changing the time for which each of the plurality of light sources is turned on within a time period of one frame.

The electro-optical device may be, for example, a liquid crystal display device, and includes a display panel, such as a liquid crystal display panel, and an illumination device. The illumination device is provided with a plurality of light sources emitting light of red (R), green (G), blue (B), and white (W). The light sources may be implemented by LEDs. The illumination device illuminates the display panel by transmitting the light emitted from the plurality of light sources through the display panel. The chromaticity of a display screen of the display panel is adjusted to a predetermined chromaticity by changing the time for which each of the plurality of light sources is turned on within a time period of one frame. Therefore, the power consumption of the plurality of light sources can be reduced compared with a case where the plurality of light sources emit light by flowing a constant current through the light sources.

In an embodiment of the electro-optical device, at least one of the plurality of light sources is turned on in the time period of one frame. Therefore, a reduction in brightness of the display screen can be prevented, thus allowing image display in a manner that is perceived as natural to the human eye.

In a specific embodiment of the electro-optical device, the light source emitting the light of white in the plurality of light sources is turned on only for the time during which the light sources emitting the light of red, green, and blue are turned off within the time period of one frame.

In another embodiment of the electro-optical device, the light source emitting the light of white in the plurality of light sources is continuously turned on in the time period of one frame. Therefore, the brightness can be appropriately increased with the adjustment of the white balance.

In another embodiment of the electro-optical device, the light source emitting the light of blue in the plurality of light sources is turned on for a longer time within the time period of one frame than the light source emitting the light of red and the light source emitting the light of green. The display panel absorbs more blue light than any other color component when the display panel transmits white light from the illumination device. According to this embodiment, the brightness of the blue light in the light emitted from the illumination device can be increased. Therefore, the white balance of the electro-optical device can be appropriately adjusted.

In another embodiment of the electro-optical device, the display panel includes display pixels, and each of the display pixels includes four sub-pixels having three sub-pixels with colored layers for red (R), green, and blue (B) and a sub-pixel with a colored layer for a color which is complementary to one of red (R), green (G), and blue (B). For example, in a display panel formed of four color sub-pixels consisting of sub-pixels for red (R), green (G), and blue (B), and a sub-pixel for cyan (C), which is complementary to red, the white balance tends to be shifted to green compared with a display panel formed of three color sub-pixels for RGB. The illumination device capable of increasing the brightness of the blue light is particularly useful for such a display panel.

According to another aspect of the invention, an electronic apparatus includes the above-described electro-optical device as a display unit.

According to still another aspect of the invention, an illumination device includes a plurality of light sources emitting light of red (R), green (G), blue (B), and white (W). The chromaticity of light that is a combination of the light emitted from the plurality of light sources is adjusted to a predetermined chromaticity by changing the time for which each of the plurality of light sources is turned on within a time period of one frame. This structure also achieves a reduction in power consumption in the plurality of light sources.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described hereinbelow with reference to the drawings.

Structure of Liquid Crystal Display Device

The structure and the like of a liquid crystal display device 100 according to the embodiment will be described with reference to FIGS. 1 and 2.

Figure 1:
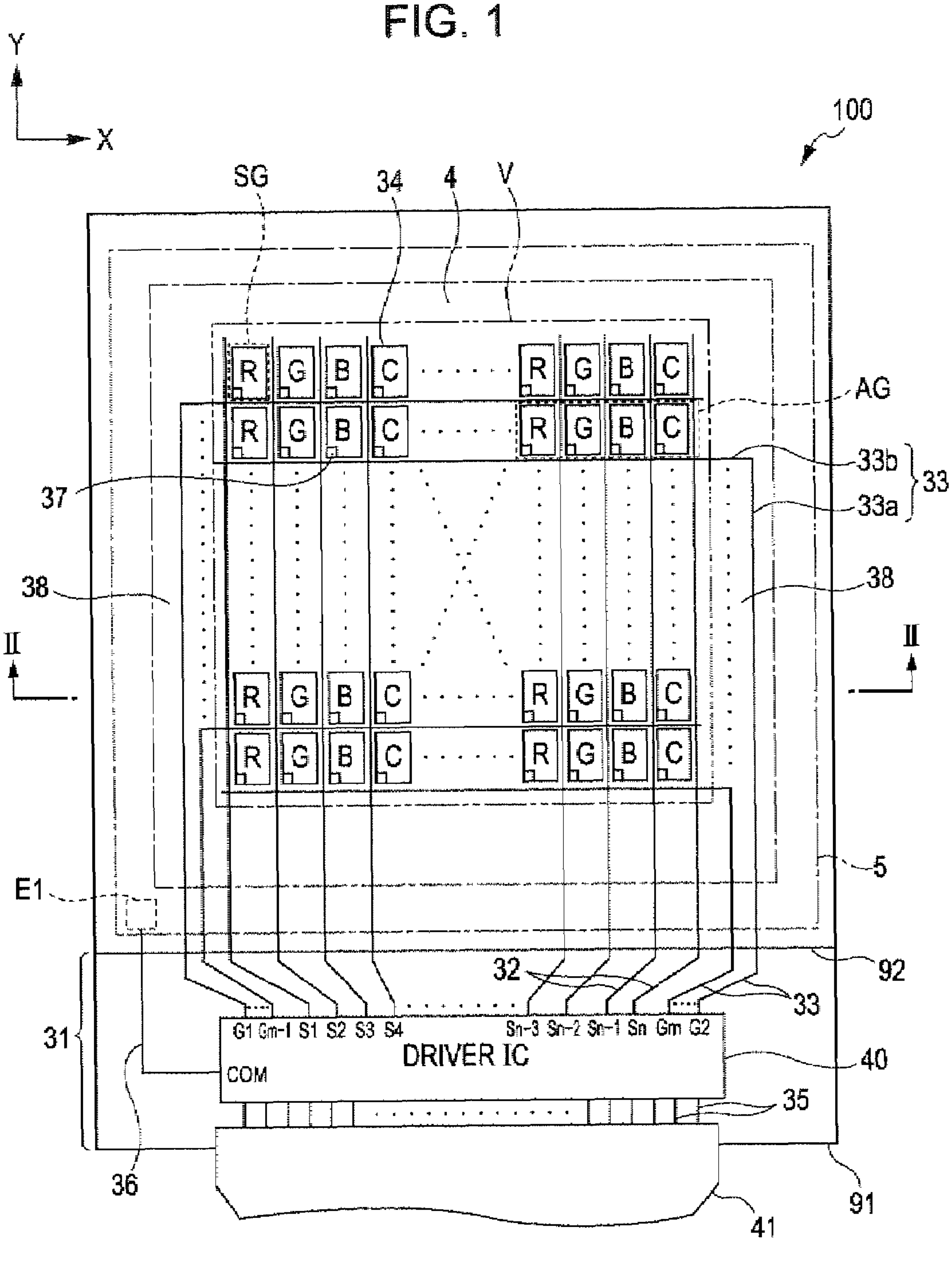
FIG. 1 is a plan view of a liquid crystal display device according to an embodiment of the invention.

FIG. 1 is a plan view schematically showing the structure of the liquid crystal display device 100 according to the embodiment. A color filter substrate 92 is illustrated at the front side when viewed in FIG. 1 (near the observer of FIG. 1), and an element substrate 91 is illustrated at the rear side when viewed in FIG. 1. The vertical direction in FIG. 1 (the column direction) is defined as the Y-direction, and the horizontal direction in FIG. 1 (the row direction) is defined as the X-direction. In FIG. 1, each of regions represented by R (red), G (green), B (blue), and C (cyan) indicates a sub-pixel SG, and an array of four sub-pixels SG for R, G, B, and C in one row indicates a display pixel AG.

Figure 2:
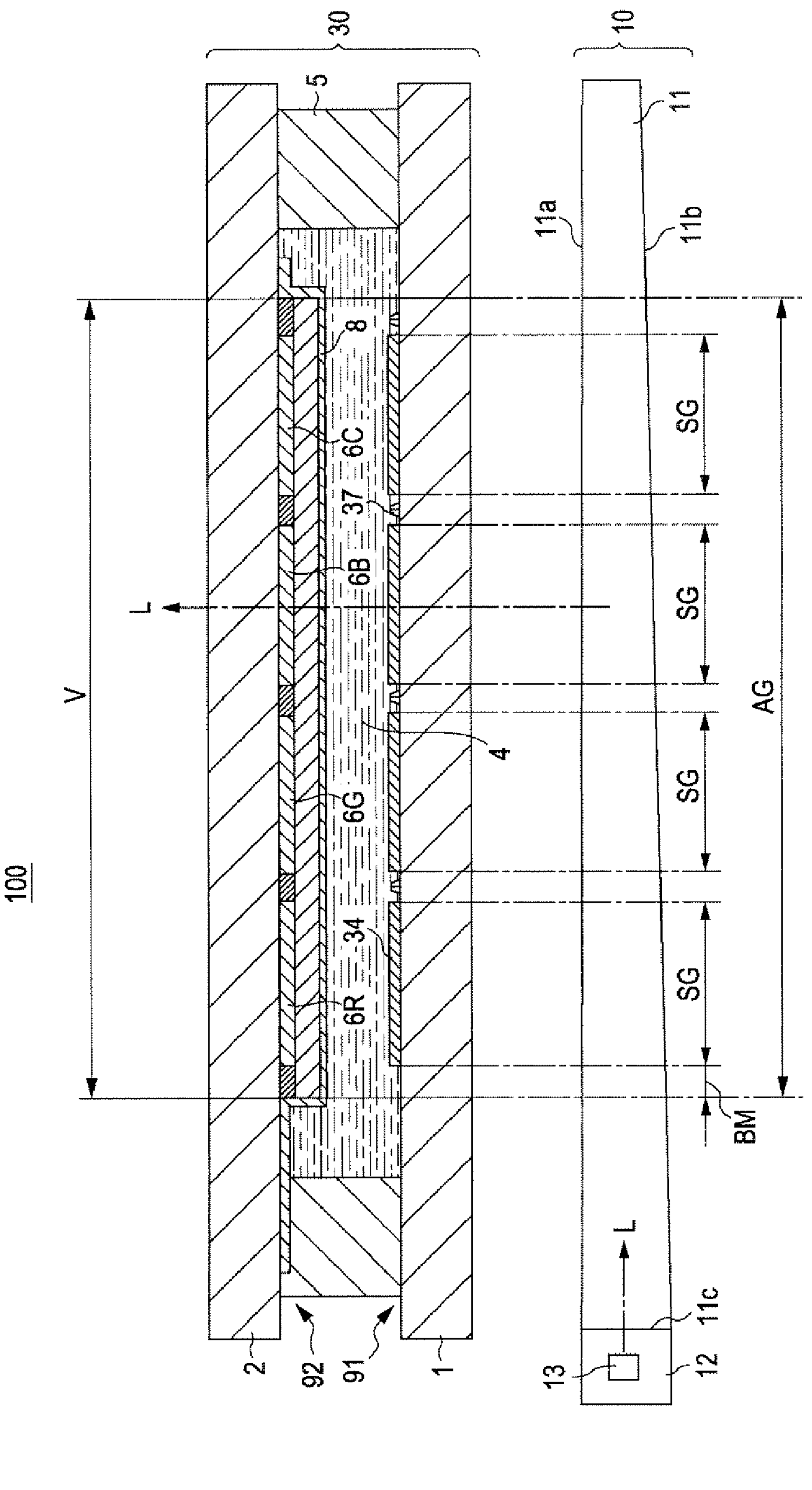
FIG. 2 is a cross-sectional view of the liquid crystal display device according to the embodiment.

FIG. 2 is an enlarged cross-sectional view of one of the display pixels AG in the liquid crystal display device 100, taken along a line II-II of FIG. 1. As shown in FIG. 2, the liquid crystal display device 100 includes a liquid crystal display panel 30 and an illumination device 10. The liquid crystal display panel 30 is configured such that the element substrate 91 and the color filter substrate 92 facing the element substrate 91 are bonded to each other with a frame-shaped sealant 5 therebetween, and a liquid crystal material is sealed inside the sealant 5 to form a liquid crystal layer 4. The liquid crystal material used for the liquid crystal layer 4 is, for example, a twisted nematic (TN) liquid crystal material. The illumination device 10 is provided on an outer surface of the element substrate 91 of the liquid crystal display panel 30.

The liquid crystal display device 100 according to the embodiment is a liquid crystal display device for color display using four RGBC colors, and is an active-matrix-driven liquid crystal display device using α-Si thin-film transistor (TFT) elements as switching elements.

The plan-view structure of the element substrate 91 will be described. A plurality of source lines 32, a plurality of gate lines 33, a plurality of α-Si TFT elements 37, a plurality of pixel electrodes 34, a driver IC 40, external connection wiring lines 35, and a flexible printed circuit (FPC) 41, and so forth are primarily formed or mounted on the internal surface of the element substrate 91.

As shown in FIG. 1, the element substrate 91 has a projecting section 31 that projects outward from a side of the color filter substrate 92, and the driver IC 40 is mounted on the projecting section 31. The driver IC 40 is provided with input-side terminals (not shown), which are electrically connected to first ends of the plurality of external connection wiring lines 35, and second ends of the plurality of external connection wiring lines 35 are electrically connected to the FPC 41. The source lines 32 extend in the Y-direction and are appropriately spaced apart from one another in the X-direction. An end of each of the source lines 32 is electrically connected to an output-side terminal (not shown) of the driver IC 40.

Each of the gate lines 33 includes a first wiring line 33*a* that extends in the Y-direction, and a second wiring line 33*b* that extends in the X-direction from the terminal end of the first wiring line 33*a*. The second wiring lines 33*b* of the gate lines 33 extend in the direction orthogonal to the source lines 32, i.e., the X-direction, and are appropriately spaced apart from one another in the Y-direction. An end of the first wiring line 33*a* of each of the gate lines 33 is electrically connected to an output-side terminal (not shown) of the driver IC 40. The α-Si TET elements 37 are disposed at intersections of the source lines 32 and the second wiring lines 33*b* of the gate lines 33, and are electrically connected to the corresponding source lines 32, gate lines 33, pixel electrodes 34, and so forth. The α-Si TFT elements 37 and the pixel electrodes 34 are disposed at the positions corresponding to the sub-pixels SG on a substrate 1 such as a glass substrate. Each of the pixel electrodes 34 is made of, for example, a transparent conductive material such as indium-tin oxide (ITO)

An area in which a plurality of display pixels AG are arranged in the X-direction and the Y-direction so as to form a matrix is an effective display area V (which is surrounded by a two-dot chain line). An image of letters, numbers, figures, and others is displayed on the effective display area V. An area outside the effective display area V is a frame area 38 that does not contribute to the display. An alignment film (not shown) is formed on the internal surface of the source lines 32, the gate lines 33, the α-Si TFT elements 37, the pixel electrodes 34, and so forth.

The plan-view structure of the color filter substrate 92 will be described. As shown in FIG. 2, the color filter substrate 92 includes a light-shielding layer (which is generally called a black matrix, hereinafter referred to as a "BM"), four colored layers 6R, 6S, 6B, and 6C for R, G, B, and C, a common electrode 8, and so forth, which are defined on a substrate 2 such as a glass substrate. The BM is defined at positions at which the sub-pixels SG are separated. In the following description or the drawings, the components may be represented without the colors specified, such as the colored layer 6, or may be represented with the colors specified, such as the colored layer 6R. The sub-pixels SG for the respective RGBC colors are provided with the colored layers 6R, 6G, 6B, and 6C for RGBC, respectively. The colored layers 6R, 6G, 6B, and 6C for RGBC serve as color filters for the respective colors. As in the pixel electrodes 34, the common electrode 8 is also made of a transparent conductive material, such as ITO, and is disposed on substantially the entirety of the color filter substrate 92. The common electrode 8 is electrically connected to an end of a wiring line 36 at a corner section E1 of the sealant 5, and the other end of the wiring line 36 is electrically connected to an output terminal, marked CON, of the driver IC 40.

Next, the illumination device 10 will be described. The illumination device 10 includes an optical waveguide 11 and a light source unit 12. The light source unit 12 emits light L toward an end surface 11*c* of the optical waveguide 11. The light source unit 12 includes a plurality of LEDs 13R, 13G, 13B, and 13W for RGBW colors serving as point light sources, as described in detail below. The light L emitted from the light source unit 12 is a combination of light of RGBW colors, which are emitted from the respective LEDs 13R, 13G, 13B, and 13W.

The light L emitted from the light source unit 12 enters the optical waveguide 11 from the end surface (hereinafter referred to as a "light incoming end surface") 11*c* of the optical waveguide 11, and is re-directed by repeatedly reflecting on a light outgoing surface 11*a* and reflecting surface 11*b* of the optical waveguide 11. When the angle defined between the light outgoing surface 11*a* of the optical waveguide 11 and the light L exceeds a critical angle, the light L is emitted as illuminating light L from the light outgoing surface 11*a* of the optical waveguide 11 to the liquid crystal display panel 30 through an optical sheet (not shown). The liquid crystal display device 100 is illuminated by the light L that passes through the liquid crystal display panel 30. Thus, the liquid crystal display device 100 displays an image of letters, numbers, figures, and others, and an observer can visually recognize the image.

In the liquid crystal display device 100, the gate lines 33 are sequentially selected one-by-one by the driver IC 40 in the order of G1, G2, . . . , Gm-1, and Gm (m is a natural number) in accordance with signals and power from the FPC 41 connected to a main substrate or the like of an electronic apparatus, and the selected gate line 33 is supplied with a gate signal of a selected voltage while the remaining unselected gate lines 33 are supplied with a gate signal of an unselected voltage. The driver IC 40 supplies a source signal based on the display contents to the pixel electrodes 34 located at the positions corresponding to the selected gate line 33 via the associated source lines 32 represented by S1, S2, . . . Sn-1, and Sn (n is a natural number) and the associated α-Si TFT elements 37. As a result, the alignment of the liquid crystal layer 4 is controlled, and the display mode of the liquid crystal display device 100 is changed to a non-display mode or an intermediate mode.

While the liquid crystal display device 100 according to the embodiment is illustrated as a transmissive liquid crystal display device, the invention is not limited thereto, and a transflective liquid crystal display device may alternatively be used. While the liquid crystal display panel 30 uses the α-Si TFT elements 37 as switching elements, the invention is not limited thereto, and polysilicon TFT elements or thin-film diode (TFD) elements may be used instead of α-Si TFT elements.

The liquid crystal display panel 30 is not limited to a liquid crystal display panel having a liquid crystal layer formed of a TN liquid crystal material, described above. Instead of such a liquid crystal display panel of the TN mode, a liquid crystal display panel of a vertical alignment (VA) mode, in-plane switching (IPS) mode, or fringe field structure (FFS) mode may be used.

Structure of Illumination Device

Figure 3A:
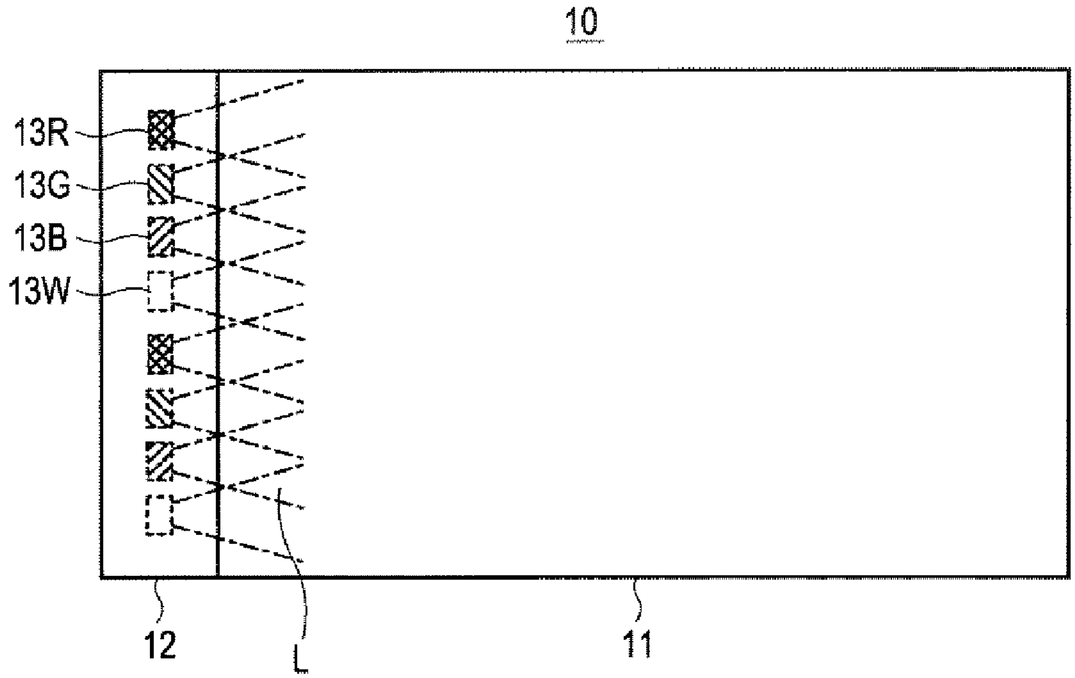
FIGS. 3A and 3B are plan views of an illumination device according to the embodiment.
Figure 3B:
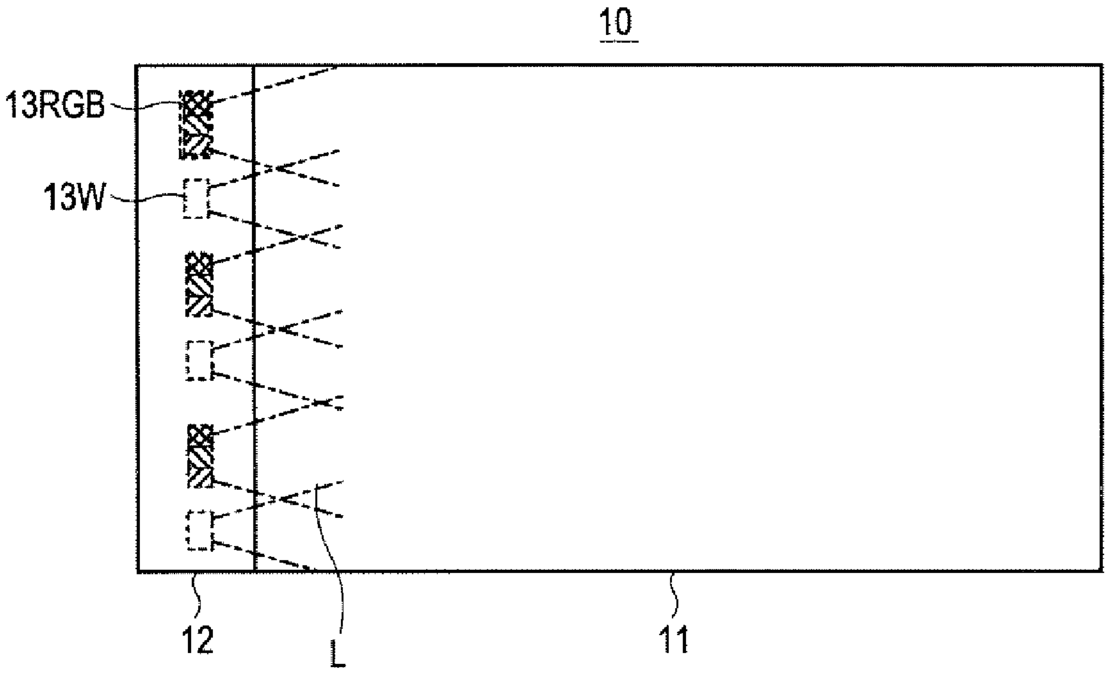

The illumination device 10 according to the embodiment will be described in detail hereinbelow. FIG. 3A is a plan view of the illumination device 10 according to the embodiment. As discussed above, the light L emitted from the light source unit 12 is a combination of the light of RGBW colors emitted from the respective LEDs 13R, 13G, 13B, and 13W. The white LED 13W is a single-chip white LED. Specifically, the white LED 13W is composed of a blue LED and a YAG (yttrium-aluminum-garnet) based phosphor, in which the YAG-based phosphor is excited by blue light from the blue LED to emit white light. As shown in FIG. 3A, the light source unit 12 is provided with the same number of LEDs 13R, 13G, 13B, and 13W for RGBW colors. The LEDs 13R, 13G, 13B, and 13W for RGBW colors emit light by flowing a current through them The light intensity of the light emitted by the LEDs 13R, 13G, 13B, and 13W for RGBW colors changes depending on the magnitude of the current flowing through the respective LEDs. The illumination device 10 of the embodiment is not limited to that shown in FIG. 3A. Alternatively, as shown in FIG. 3B, an LED 13RGB capable of emitting light of RGB colors by means of a single LED and a white LED 13W may be used. The LED 13RGB is a single LED having light-emitting elements for RGB colors embedded therein. The light-emitting elements for RGB colors emit light by flowing currents through the respective light-emitting elements.

Figure 4:
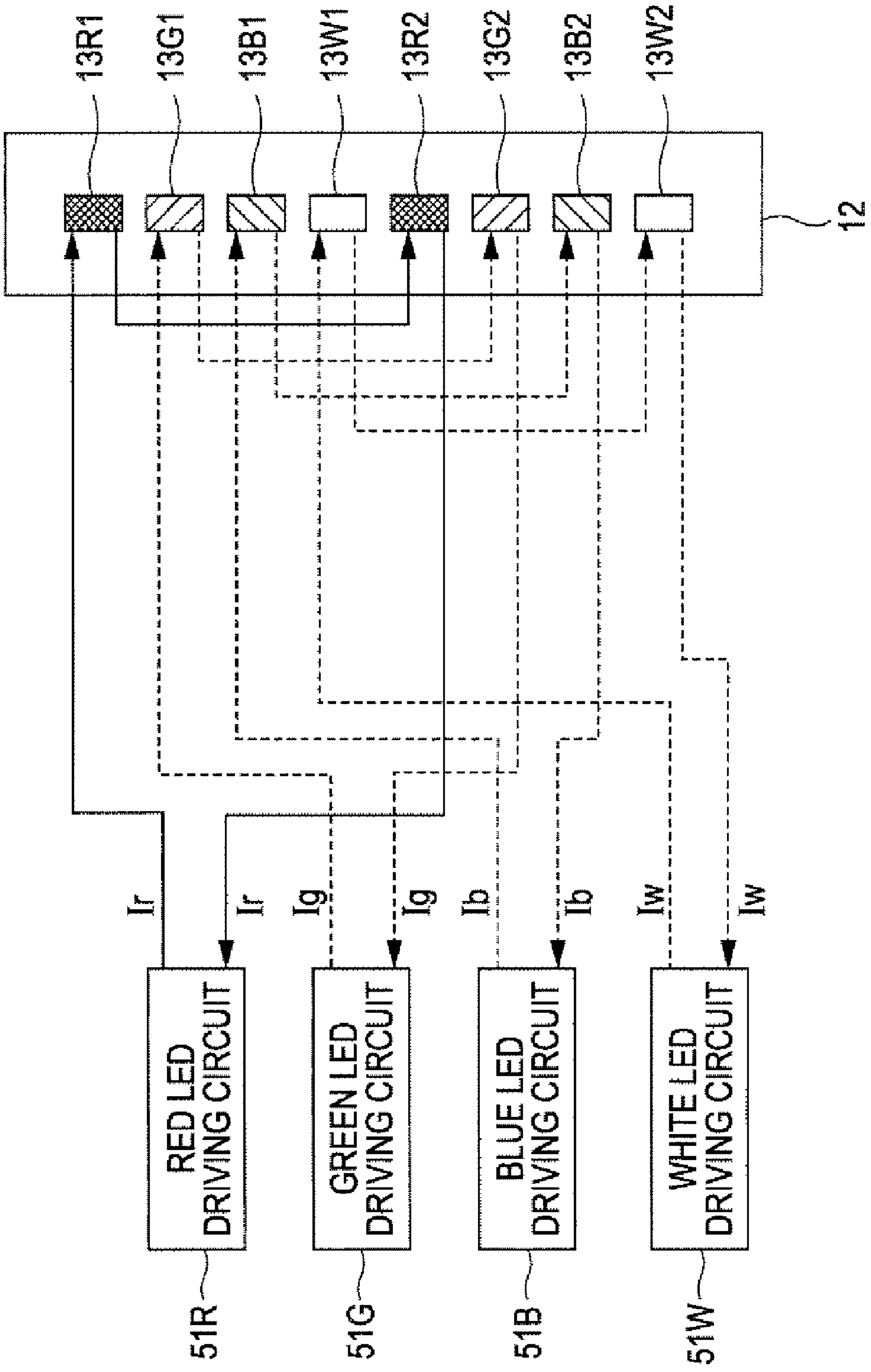
FIG. 4 is a schematic diagram of a light source unit of the illumination device according to the embodiment.

FIG. 4 is a schematic diagram of the light source unit 12 of the illumination device 10 having the structure shown in FIG. 3A. In FIG. 4, the light source unit 12 is provided with two LEDs 13R, 13G, 13B, and 13W for the respective RGBW colors, by way of example. That is, as shown in FIG. 4, the light source unit 12 is provided with two red LEDs 13R, namely, red LEDs 13R1 and 13R2, two green LEDs 13G, namely, green LEDs 13G1 and 13G2, two blue LEDs 13B, namely, blue LEDs 13B1 and 13B2, and two white LEDs 13W, namely, white LEDs 13W1 and 13W2.

The red LEDs 13R1 and 13R2 are electrically connected in series. A red LED driving circuit 51R causes a current Ir to flow through the red LEDs 13R1 and 13R2 connected in series. In FIG. 4, the flow of the current flowing through the red LEDs 13R1 and 13R2 is indicated by solid arrows. The current Ir is caused to flow through both the red LEDs 13R1 and 13R2, and the red LEDs 13R1 and 13R2 emit red light beams having the same light intensity.

In FIG. 4, the flow of currents flowing through the green LEDs 13G1 and 13G2, the blue LEDs 13B1 and 13B2, and the white LEDs 13W1 and 13W2, which are indicated by broken arrows, are further illustrated.

The green LEDs 13G1 and 13G2 are electrically connected in series. A green LED driving circuit 51G causes a current Ig to flow through the green LEDs 13G1 and 13G2 connected in series. Thus, the current Ig is caused to flow through both the green LEDs 13G1 and 13G2, and the green LEDs 13G1 and 13G2 emit green light beams having the same light intensity.

Likewise, the blue LEDs 13B1 and 13B2 are electrically connected in series. A blue LED driving circuit 51B causes a current Ib to flow through the two blue LEDs 13B1 and 13B2 connected in series. Thus, the current Ib is caused to flow through both the blue LEDs 13B1 and 13B2, and the blue LEDs 13B1 and 13B2 emit blue light beams having the same light intensity.

Likewise, the white LEDs 13W1 and 13W2 are electrically connected in series. A white LED driving circuit 51W causes a current Iw to flow through the white LEDs 13W1 and 13W2 connected in series. Thus, the current Iw is caused to flow through both the white LEDs 13W1 and 13W2, and the white LEDs 13W1 and 13W2 emit white light beams having the same light intensity.

Figure 5:
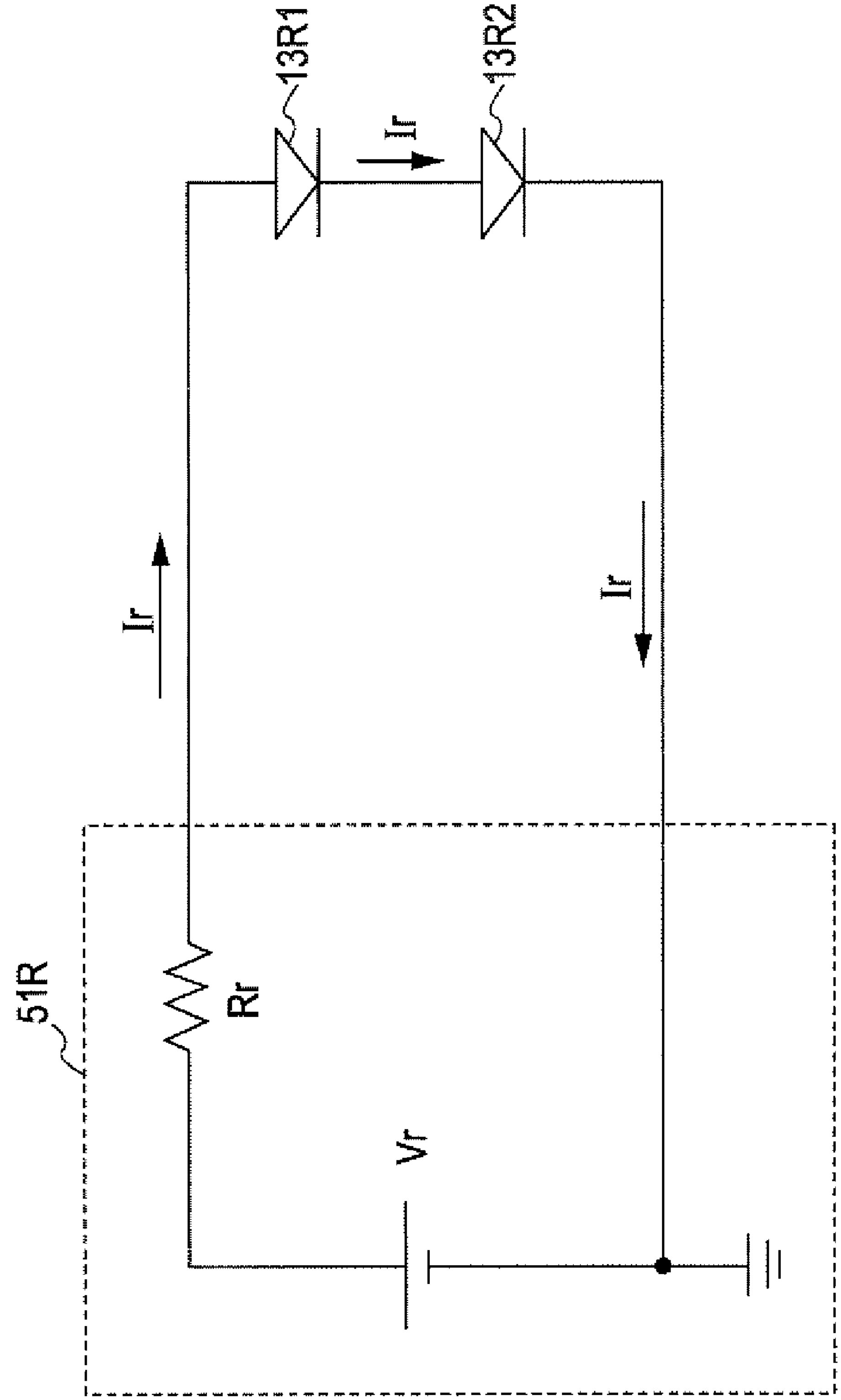
FIG. 5 is a circuit diagram of an LED driving circuit according to the embodiment.

FIG. 5 is a circuit diagram of the red LED driving circuit 51R according to the embodiment, by way of example. The red LED driving circuit 51R includes a current-limiting resistor Rr and a power supply Vr. The resistance of the current-limiting resistor Rr is determined depending on the tolerance of the current Ir that can flow through the red LEDs 13R1 and 13R2. The power supply Vr supplies a pulse current to the red LEDs 13R1 and 13R2. The width of the pulse current and the timing at which the pulse current is supplied to the red LEDs 13R1 and 13R2 are changed by controlling the power supply Vr. As in the red LED driving circuit 51R, the green LED driving circuit 51G, the blue LED driving circuit 51B, and the white LED driving circuit 51W include power supplies for supplying a pulse current to the electrically connected green LEDs 13G1 and 13G2, blue LEDs 13B1 and 13B2, and white LEDs 13W1 and 13W2, respectively.

As can be seen from the foregoing description, in the light source unit 12 according to the embodiment, the LEDs 13 for the respective RGBW colors are provided with the LED driving circuits 51 for the respective colors. The LED driving circuits 51 connected to the LEDs 13 for the respective colors include power supplies for supplying a pulse current to the electrically connected LEDs 13 for the respective colors and controlling the pulse current. The LED driving circuits provided for the LEDs for the respective colors allow pulse currents to be individually applied to the LEDs for the respective colors.

Also in the illumination device 10 having the structure shown in FIG. 3B, an LED driving circuit is provided for each of the light-emitting elements for the respective colors in the LED 13RGB and the white LED 13W, thereby applying a pulse current separately to them.

Driving Method for Illumination Device

A driving method for the illumination device 10 will be described hereinbelow. As discussed above, the illumination device 10 emits the light L from the light source unit 12 by applying the individual pulse currents to the LEDs 13.

In a typical liquid crystal display device having colored layers for RGB, the light transmittance of the colored layers in the liquid crystal display panel differs depending on the thickness of the colored layers, etc. As the light beams emitted from the LEDs pass through the colored layers, the light intensities of the light beams for the respective RGB colors change. Thus, even when predetermined white light is generated in the illumination device, the color of the white light transmitted through the colored layers is not necessarily the same as the color of the predetermined white light. In other words, a white color observed by an observer when the white color is displayed on the display screen is not necessarily the same as the color of the predetermined white light generated in the illumination device. The ratio of the light intensities of the respective RGB light components in the white light changes depending on the transmittances of the colored layers, thus causing the observer to perceive the white color displayed on the display screen to be different from the color of the predetermined white light generated in the illumination device. Further, the colored layers absorb more blue light than any other RGB light. In a typical liquid crystal display device having colored layers for RGB, therefore, it is necessary for the illumination device to generate white light whose blue light component is large.

As in the liquid crystal display device 100 according to the embodiment, when the white display is performed by using the liquid crystal display panel 30 having the colored layers 6 for RGBC, because of the provision of the colored layer 6C for cyan, the white balance tends to be shifted to green compared with a typical liquid crystal display device having colored layers for RGB. It is therefore necessary for the illumination device 10 to generate white light whose blue light component is larger than an illumination device in the typical liquid crystal display device having the colored layers for RGB.

Figure 6:
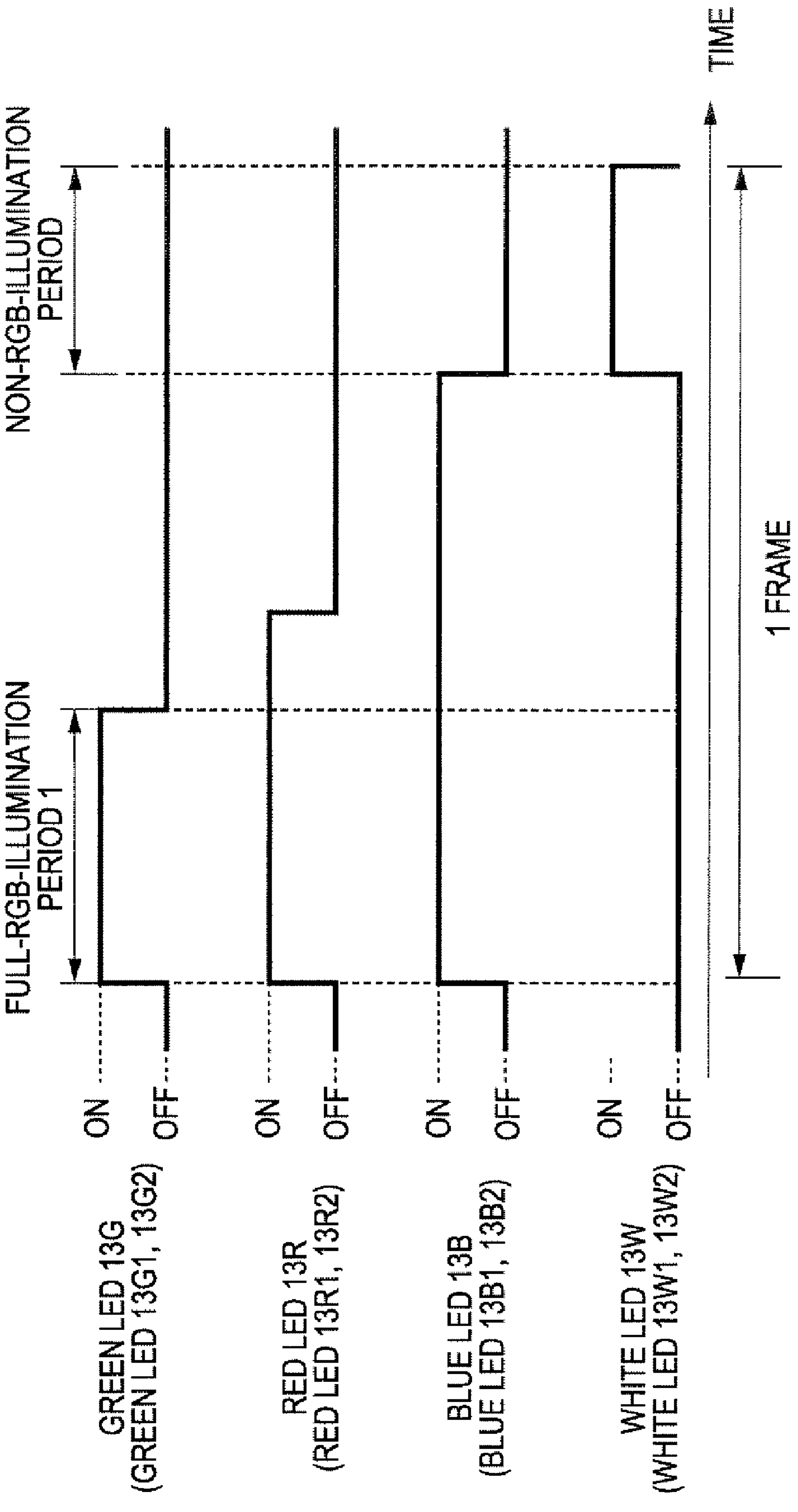
FIG. 6 is a timing chart showing a driving sequence for an LED.

FIG. 6 is a timing chart showing a driving sequence for the LEDs 13 for the respective colors in the illumination device 10 according to the embodiment. In FIG. 6, the LEDs 13 for the respective colors are in an illumination state when turned on, and are in a non-illumination state when turned off. For example, referring to FIG. 4, when the red LED 13R is turned on, both the red LEDs 13R1 and 13R2 are lit; when the red LED 13R is turned off, both the red LEDs 13R1 and 13R2 are unlit. In FIG. 6, likewise, when the green LED 13G, the blue LED 13B, and the white LED 13W are turned on and off, both the green LEDs 13G1 and 13G2, both the blue LEDs 13B1 and 13B2, and both the white LEDs 13W1 and 13W2 are lit and unlit, respectively.

In the illumination device 10 according to the embodiment, the LEDs 13 for the respective colors are illuminated on a time-division basis. Specifically, as shown in FIG. 6, among the LEDs 13 for the three RGB colors, the blue LED 13B is turned on for the longest time within a time period of one frame. In the following description, the period of time during which the LEDs 13 for the respective colors are turned on is referred to as an "illumination period", and the period of time during which the LEDs 13 for the respective colors are turned off is referred to as a "non-illumination period". The chromaticity of the light L emitted from the illumination device 10 and the chromaticity of the display screen of the liquid crystal display panel 30 are adjusted to a predetermined chromaticity by changing the illumination period of the LEDs 13 for the respective RGBW colors within the time period of one frame. By doing so, the illumination period of the LEDs 13 for the respective RGBW colors can be reduced compared with constant illumination by flowing a constant current through the LEDs 13 for the respective RGBW colors, and a reduction in power consumption can be achieved. A full-RGB-illumination period 1 is a period of time during which all of the LEDs 13 for the three RGB colors are turned on.

Generally, the time period of one frame is about 1/60 second. Thus, even if the LEDs 13 for the respective colors are illuminated on a time-division basis, the change in color is not recognized by the human eye due to the persistence of vision. The time-division illumination of the LEDs 13 for the respective colors allows the human eye to perceive the light L with different color tones depending on the illumination period of the LEDs 13 for the respective colors. Specifically, in the light L, the color of the light emitted from the LED 13 which is turned on for a longer time within the time period of one frame appears more dense, and the color of the light emitted from the LED 13 which is turned on for a shorter time within the time period of one frame appears less dense. In the illumination device 10 according to the embodiment, for example, among the LEDs 13 for the three RGB colors, the blue LED 13B is turned on for the longest time within the time period of one frame, and the light L appears as white light with a bluish tinge.

Therefore, if the white balance is shifted to green on the liquid crystal display panel 30 due to the additional provision of the colored layer 6C for cyan, the illumination device 10 turns on the blue LED 13B for the longest time among the LEDs 13 for the three RGB colors, thereby increasing the brightness of the blue light in the light L and appropriately adjusting the white balance on the liquid crystal display panel 30. It is to be understood that the illumination device 10 of the invention can increase the brightness of the blue light when used as an illumination device of a typical liquid crystal display device having colored layers for RGB, and is therefore useful for appropriate adjustment of the white balances While, in FIG. 6, the red LED 13R is turned on for a longer time than the green LED 13G, the invention is not limited thereto. The green LED 13G may be turned on for a longer time than the red LED 13R, or the green LED 13G and the red LED 13R may be turned on for the same time. What is important is to increase the brightness of the blue light in the light L, and it is only required to turn on the blue LED 13B for a longer time than the red LED 13R and the green LED 13G. Preferably, the red LED 13R is turned on for a longer time than the green LED 13G. This is because, as discussed previously, the liquid crystal display device 100 having the colored layers 6 for RGBC has the tendency of the white balance being shifted to green, and it is more effective to decrease the green light component compared with the red light component in the light L emitted from the illumination device 10 in order to prevent the white balance from being shifted to green.

Further, in FIG. 6, the time period of one frame includes a period of time during which all of the LEDs 13 for the respective RGB colors are turned off (hereinafter referred to as a "non-RGB-illumination period". In the non-RGB-illumination period, the display screen is dark. The existence of the non-RGB-illumination period causes the human eye to perceive flicker. In the illumination device 10 according to the embodiment, therefore, as shown in FIG. 6, the white LED is turned on in the non-RGB-illumination period. That is, in the driving sequence shown in FIG. 6, there is no period of time during which all of the LEDs for the RGBW colors are turned off, and at least one of the LEDs for the RGBW colors is turned on. Accordingly, the illumination device 10 can prevent a reduction in brightness of the display screen in the non-RGB-illumination period, and can perform image display in a manner that is perceived as natural to the human eye.

Modifications

Figure 7:
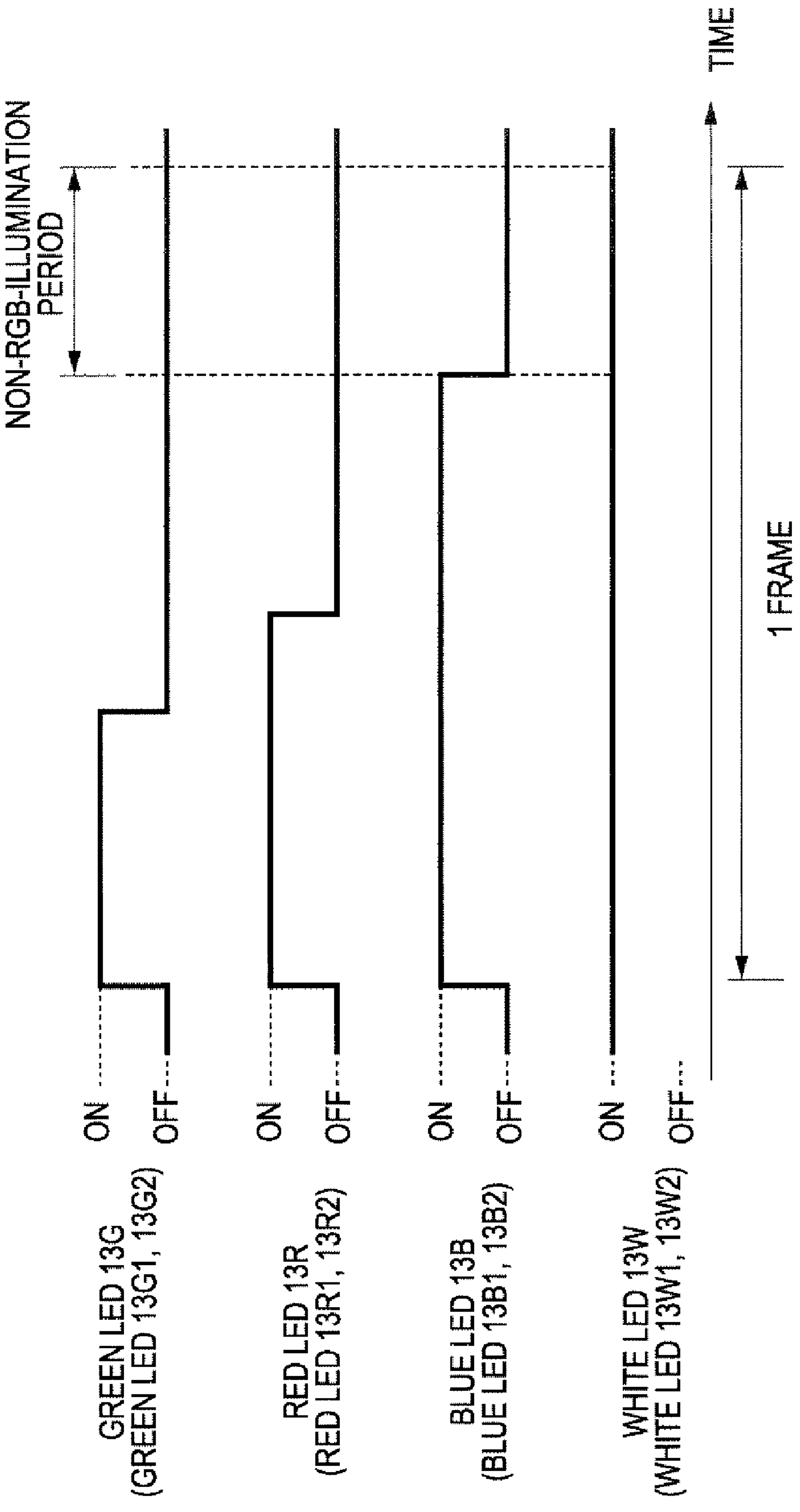
FIG. 7 is a timing chart showing a driving sequence for an LED.

FIG. 7 is a timing chart showing a first modification of the driving sequence for the LEDs 13 for the respective colors in the illumination device 10 according to the embodiment. The driving sequence shown in FIG. 7 is different from the driving sequence shown in FIG. 6 in that the white LED 13W is continuously turned on in the time period of one frame. That is, in the first modification, the white LED 13W is also turned on for a period of time during which the LEDs 13 for the respective RGB colors are turned on. In the driving sequence shown in FIG. 6, the LEDs 13 for the respective RGB colors are illuminated on a time-division basis, which contributes to a reduction in power consumption, although the brightness of the green light component and the red light component may be low. Therefore, the white LED 13W with wide color gamut is also turned on for a period of time during which the LEDs 13 for the respective RGB colors are turned on, whereby the brightness can be appropriately increased with the adjustment of the white balance.

Figure 8:
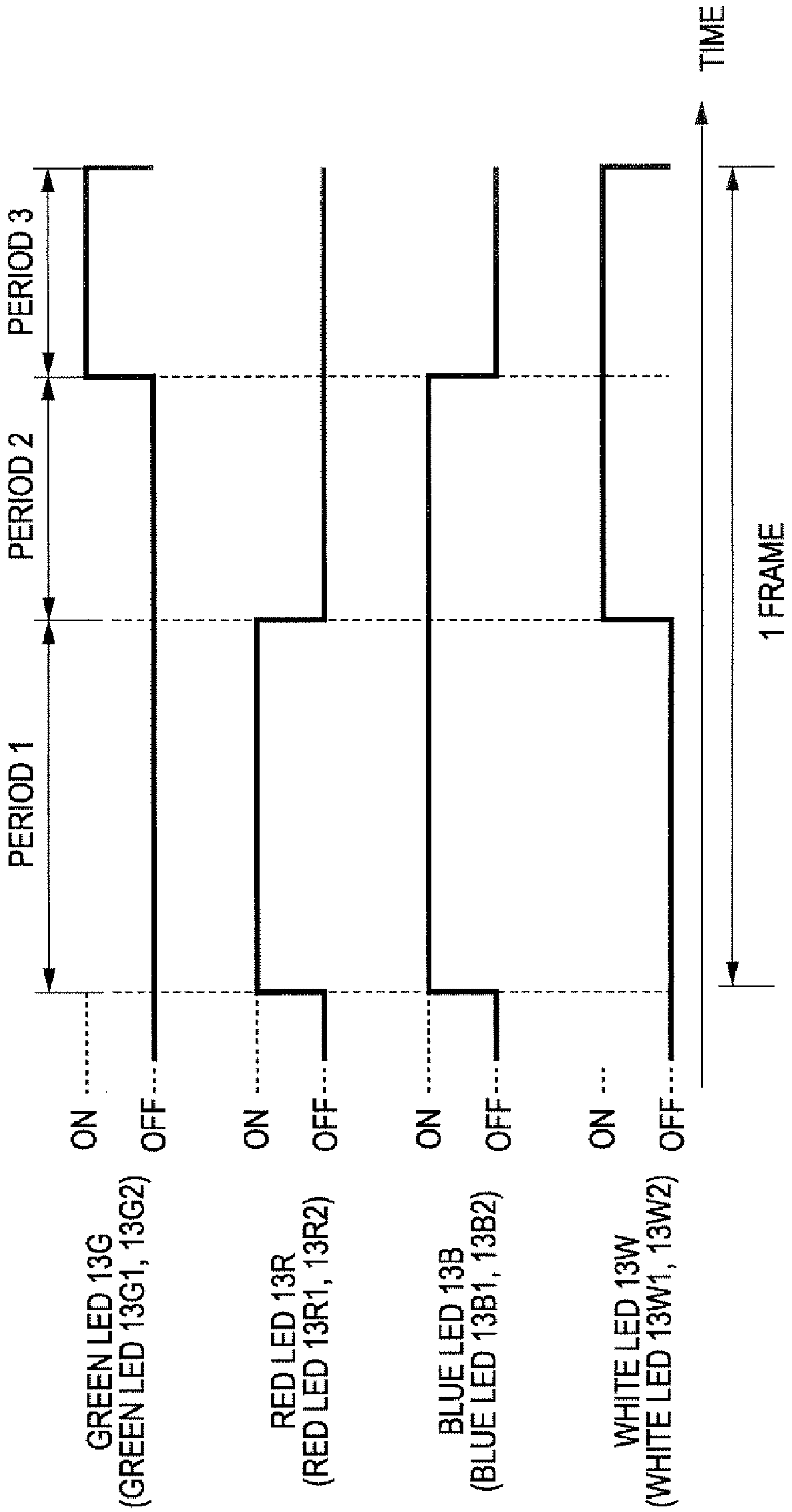
FIG. 8 is a timing chart showing a driving sequence for an LED.
Figure 9:
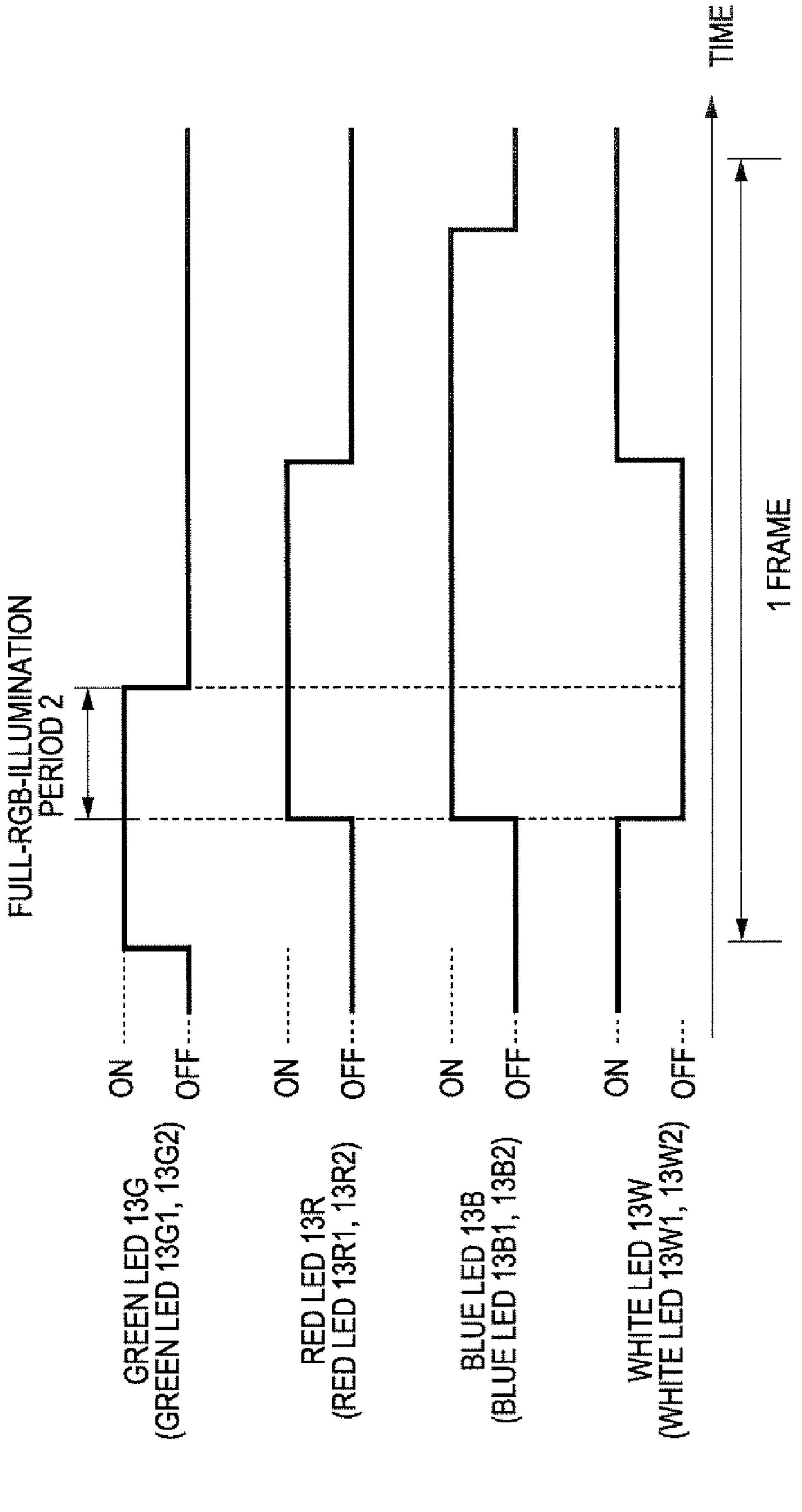
FIG. 9 is a timing chart showing a driving sequence for an LED.

FIGS. 8 and 9 are timing charts showing second modifications of the driving sequence for the LEDs 13 in the illumination device 10 according to the embodiment. In FIGS. 8 and 9, the white LED 13W is turned on only for a period of time during which two of the LEDs 13 for the three RGB colors are turned off. In the driving sequence shown in FIG. 8, as in periods 1 to 3, only two of the LEDs 13 for the respective RGBW colors are always turned on, and the period of time during which all of the three LEDs for RGB are turned on does not exist, which is different from the driving sequence shown in FIG. 6. In the driving sequence shown in FIG. 9, all of the three LEDs 13 for RGB are turned on only for a full-RGB-illumination period 2. In the above-described driving sequence shown in FIG. 6, all of the three LEDs 13 for RGB are turned on for the full-RGB-illumination period 1, i.e., the period of time during which the green LED 13G is turned on. Thus, the full-RGB-illumination period 2 shown in FIG. 9 is shorter than the full-RGB-illumination period 1 shown in FIG. 6. That is, in the driving sequence shown in FIG. 9, the time for which all of the three LEDs for RGB are turned on is shorter than that in the driving sequence shown in FIG. 6.

As can be seen from the foregoing description, the driving of the LEDs 13 for the respective RGBW colors according to the driving sequences shown in FIGS. 8 and 9 can achieve lower power consumption than the driving of the LEDs 13 for the respective RGBW colors according to the driving sequence shown in FIG. 6.

Applications

While the liquid crystal display panel 30 according to the embodiment has been described in the context in which one display pixel is composed of four color sub-pixels having the respective four colored layers for RGBC, the invention is not limited thereto. One display pixel may be composed of three color sub-pixels having the respective colored layers for RGB, and a sub-pixel having a colored layer for a color which is complementary to any one of the RGB colors. That is, although the liquid crystal display panel 30 according to the embodiment employs a colored layer for cyan, which is complementary to red, a colored layer for magenta (M), which is complementary to green, or a colored layer for yellow (Y), which is complementary to blue, may be used as an alternative to the colored layer for cyan. Also in this application, the illumination device 10 turns on the blue color LED 13B for the longest time among the three LEDs 13 for RGB, thereby appropriately adjusting the white balance in the liquid crystal display panel 30.

Further, while the display panel of the embodiment has been described in the context of a liquid crystal display panel, the invention is not limited thereto. The display panel may also be implemented by any other display panel, such as an electrophoretic display panel.

OTHER EMBODIMENTS

In the foregoing description, the colors of the colored layers (colored areas) serving as color filters are R, G, B, and C. However, the application of the invention is not limited thereto, and one pixel may be composed of colored areas for other four colors.

The four-color colored areas consist of, in the visible light region (ranging from 380 nm to 780 nm) with varying hues depending on the wavelengths, a colored area having a blue-like hue (hereinafter also referred to as a "first colored area"), a colored area having a red-like hue (hereinafter also referred to as a "second colored area"), and two colored areas having two color hues selected from a blue hue to a yellow hue (hereinafter also refereed to as a "third colored area" and a "fourth colored area"). The term "-like" means that, for example, a "blue-like" hue is not limited to a pure blue hue but includes bluish colors, such as blue violet and blue green. Likewise, a "red-like" hue is not limited to red but includes orange. The colored area may be formed of a single colored layer, or may be formed by laminating a plurality of colored layers with different color hues. While the colored areas are illustrated with respect to color hues, the color hues can designate colors by appropriately changing the saturation and the lightness.

Specific ranges of the hues are as follows:

The colored area with the blue-like hue ranges from blue-violet to blue-green, preferably, from indigo to blue.

The colored area with the red-like hue ranges from orange to red.

One of the colored areas with the color hues selected from the blue hue to the yellow hue ranges from blue to green, preferably, from blue-green to green.

The other of the colored areas with the color hues selected from the blue hue to the yellow hue ranges from green to orange, preferably, from green to yellow, or otherwise from green to yellow-green.

The colored areas do not use the same color hue. For example, when one of the two colored areas with the color hues selected from the blue hue to the yellow hue uses a green-like hue, the other colored area uses a blue-like or yellow-green-like hue relative to green used for the one colored area.

Thus, a wider color reproduction capability than RGB colored areas of the related art can be achieved.

While the wide color reproduction capability using the four color colored areas has been illustrated with respect to color hues, the colored areas may be represented by wavelengths of light passing through the colored areas. The followings are the representation of the four color colored areas:

The blue-like color area is a colored area through which light with a peak wavelength of 415 to 500 nm, preferably, 435 to 485 nm, is transmitted.

The red-like color area is a colored area through which light with a peak wavelength of 600 nm or higher, preferably, 605 nm or higher, is transmitted.

One of the colored areas with the color hues selected from the blue hue to the yellow hue is a colored area through which light with a peak wavelength of 485 to 535 nm, preferably, 495 to 520 nm, is transmitted.

The other of the colored areas with the color hues selected from the blue hue to the yellow hue is a colored area through which light with a wavelength peak of 500 to 590 nm, preferably, 510 to 585 nm, or otherwise 530 to 565 nm, is transmitted.

The four color colored areas may also be represented by an x-y chromaticity diagram as follows:

The blue-like colored area is a colored area plotted in the plane with $x \leqq 0.151$ and $y \leqq 0.056$, preferably, $0.134 \leqq x \leqq 0.151$ and $0.034 \leqq y \leqq 0.056$.

The red-like colored area is a colored area plotted in the plane with $0.643 \leqq x$ and $y \leqq 0.333$, preferably, $0.643 \leqq x \leqq 0.690$ and $0.299 \leqq y \leqq 0.333$.

One of the colored areas with the color hues selected from the blue hue to the yellow hue is a colored area plotted in the plane with $x \leqq 0.164$ and $0.453 \leqq y$, preferably, $0.098 \leqq x \leqq 0.164$ and $0.453 \leqq y \leqq 0.759$.

The other of the colored areas with the color hues selected from the blue hue to the yellow hue is a colored area plotted in the plane with $0.257 \leqq x$ and $0.606 \leqq y$, preferably, $0.257 \leqq x \leqq 0.357$ and $0.606 \leqq y \leqq 0.670$.

These four colored areas are designed such that, if each of the sub-pixels includes a transmission region and a reflection region, the transmission region and the reflection region can also be applied in the ranges described above.

In a case where the four color colored areas of this example are used, RGBW light sources of a backlight may be implemented by the above-described LEDs, fluorescent lamps, organic electroluminescent (EL) lights, or the like.

In the RGBW light sources, preferable light sources for RGB are a light source for B from which light with a peak wavelength ranging from 435 nm to 485 nm is emitted; a light source for G from which light with a peak wavelength ranging from 520 nm to 545 nm is emitted; and a light source for R from which light with a peak wavelength ranging from 610 nm to 650 nm is emitted.

By appropriately selecting the color filters depending on the wavelengths of the light sources for RGB, a wider color reproduction capability can be achieved.

A light source with a plurality of wavelength peaks at, for example, 450 nm and 565 nm may be used.

Specific examples of the above-described four color colored areas include colored areas with red, blue, green, and cyan (blue-green) hues; colored areas with red, blue, green, and yellow hues; colored areas with red, blue, dark-green, and yellow hues; colored areas with red, blue, emerald-green, and yellow hues; colored areas with red, blue, dark-green, and yellow-green hues; and colored areas with red, blue-green, dark-green, and yellow-green hues.

Electronic Apparatus

Next, an electronic apparatus of an embodiment in which the liquid crystal display device according to the embodiment is used as a display device of the electronic apparatus will be described.

The liquid crystal display device 100 according to the embodiment may directly receive image signals for RGBC colors from an external device, or may receive image signals for RGB colors from an external device and may convert the received image signals into image signals for RGBC colors.

A case in which the liquid crystal display device 100 converts image signals for RGB colors into image signals for RGBC colors will be described.

Figure 10:
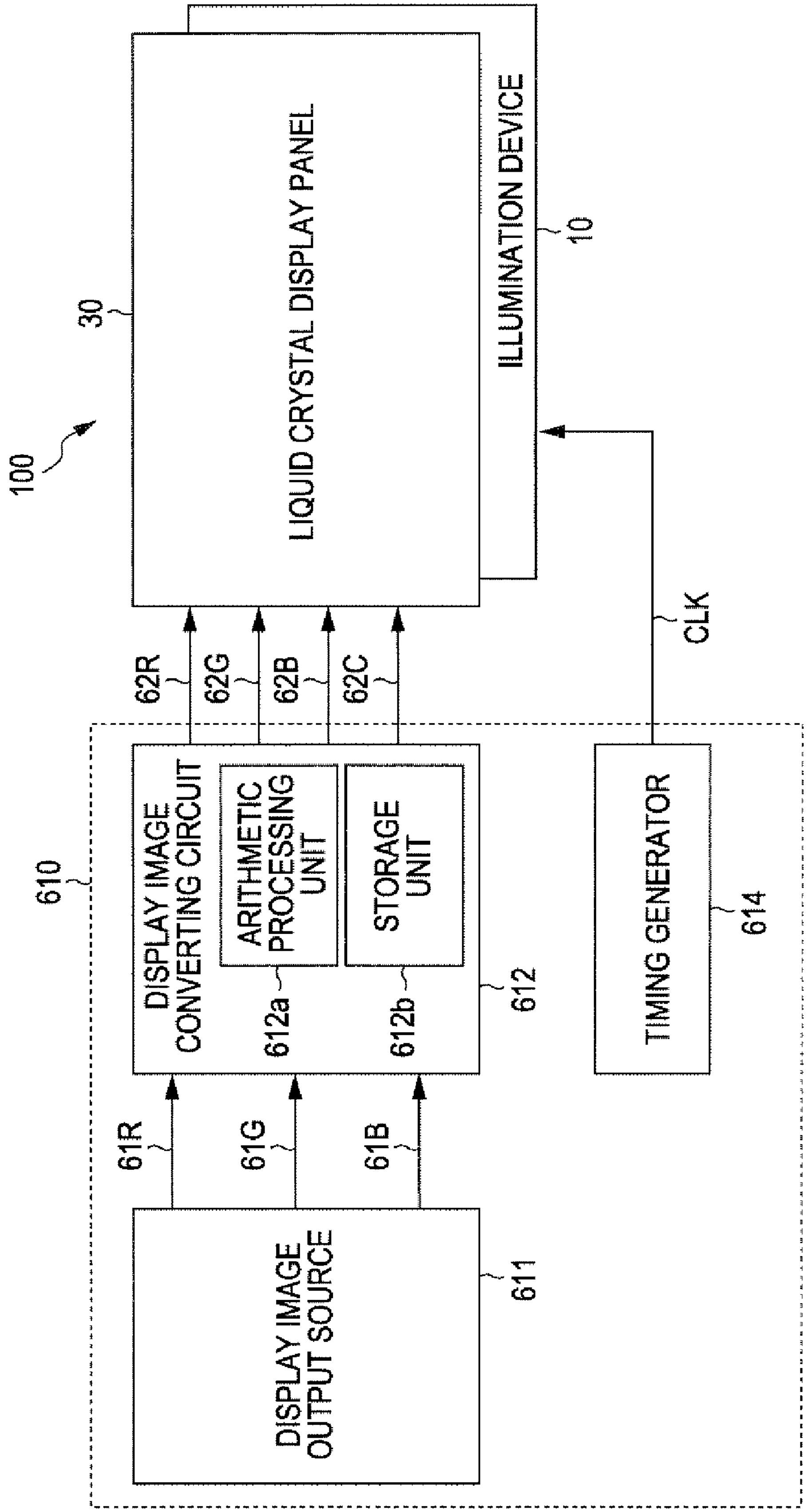
FIG. 10 is a circuit block diagram of an electronic apparatus incorporating the liquid crystal display device according to the embodiment.

FIG. 10 is a circuit block diagram schematically showing the overall structure of the electronic apparatus of the embodiment. The electronic apparatus includes the liquid crystal display device 100 as described above, and a controller 610. The controller 610 includes a display information output source 611, a display image converting circuit 612, and a timing generator 614.

In a case where the liquid crystal display device 100 converts input image signals for RGB colors into image signals for RGBC colors, the display image converting circuit 612 has a function for converting image signals for RGB colors output from the display image output source 611 of an external device, such as a personal computer, into image signals for RGBC colors and outputting the converted image signals to the liquid crystal display panel 30.

The display image converting circuit 612 includes an arithmetic processing unit 612*a*, such as a central processing unit (CPU), and a storage unit 612*b*, such as a random access memory (RAM). The arithmetic processing unit 612*a* converts RGB-color image signals 61R, 61G, and 61B of the input image output from the display image output source 611 into RGBC-color image signals 62R, 62G, 62B, and 62C. The storage unit 612*b* includes a look-up table (LUT) having the correspondence for conversion between RGB-color image signals of a predetermined intensity and RGBC-color image signals of the corresponding intensity. For example, when RGB-color image signals for displaying only cyan, e.g., RGB-color image signals with intensities of R=0, G=100, and B=100, are input to the arithmetic processing unit 612*a*, the arithmetic processing unit 612*a* obtains RGBC-color image signals with the corresponding intensities (e.g., R=0, G=10, B=10, and C=100) to the intensities of the RGB-color image signals from the LUT of the storage unit 612*b*, and outputs the obtained RGBC-color image signals to the liquid crystal display panel 30. Thus, the RGB colors, as well as cyan, can be displayed on the display screen of the liquid crystal display panel 30. Accordingly, even when image signals for RGB are input as the image signals of the input image, the color reproduction range of the output image can be extended to a color reproduction range that also covers cyan-like colors.

The timing generator 614 is provided with a hardware or software switch for switching timing modes, and generates a clock signal CLK from a luminance signal of the image signals. The driving sequence of the LED driving circuits 51 for the respective RGBW colors, as described above, is controlled according to the clock signal CLK determined by the timing generator 614.

Specific examples of the electronic apparatus incorporating the liquid crystal display device 100 according to the embodiment will be described with reference to FIGS. 11A and 11B.

In a first example, the liquid crystal display device 100 according to the invention is applied to a display unit of a mobile personal computer (so-called "notebook" PC). FIG. 11A is a perspective view showing the structure of the personal computer. As shown in FIG. 11A, a personal computer 710 includes a main body 712 having a keyboard 711, and a display unit 713 to which the liquid crystal display device 100 according to the invention is applied.

In a second example, the liquid crystal display device 100 according to the invention is applied to a display unit of a mobile phone. FIG. 11B is a perspective view showing the structure of the mobile phone. As shown in FIG. 11B, a mobile phone 720 includes a plurality of operation buttons 721, an earpiece 722, a mouthpiece 723, and a display unit 724 to which the liquid crystal display device 100 according to the invention is applied.

Figure 11A:
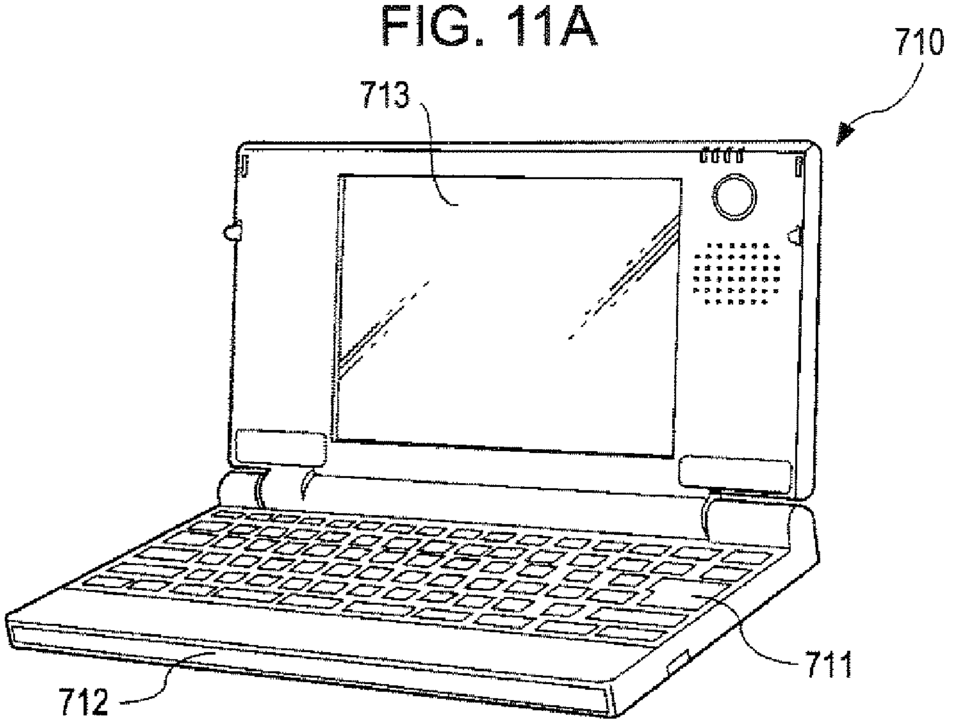
FIGS. 11A and 11B are diagrams showing examples of the electronic apparatus incorporating the liquid crystal display device according to the embodiment.
Figure 11B:
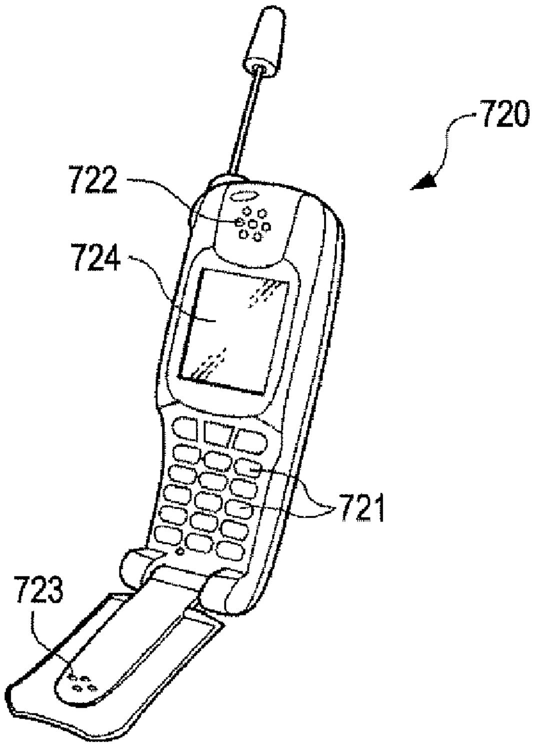

The electronic apparatus incorporating the liquid crystal display device 100 according to the invention is not limited to the personal computer 710 shown in FIG. 11A or the mobile phone 720 shown in FIG. 11B, and includes various types of electronic apparatuses, such as liquid crystal television sets, viewfinder-type or monitor direction-view type videotape recorders, car navigation systems, pagers, electronic organizers, electronic calculators, word processors, workstations, video telephones, point-of-sale (POS) terminals, and digital still cameras.

The entire disclosure of Japanese Patent Application No. 2005-272028, filed Sep. 20, 2005 and No. 2005-302963, filed Oct. 18, 2005 are expressly incorporated by reference herein.

What is claimed is:

1. An electro-optical device comprising:

a display panel; and an illumination device including a plurality of light sources emitting light of red, green, blue, and white, the illumination device being configured to illuminate the display panel by transmitting the light emitted from the plurality of light sources through the display panel, wherein the chromaticity of a display screen of the display panel is adjusted to a predetermined chromaticity by changing the time for which each of the plurality of light sources is turned on within a time period of one frame.

2. The electro-optical device according to claim 1, wherein at least one of the plurality of light sources is turned on in the time period of one frame.

3. The electro-optical device according to claim 2, wherein the light source emitting the light of white in the plurality of light sources is turned on only for the time during which the light sources emitting the light of red, green, and blue are turned off within the time period of one frame.

4. The electro-optical device according to claim 1, wherein the light source emitting the light of white in the plurality of light sources is continuously turned on in the time period of one frame.

5. The electro-optical device according to claim 1, wherein the light source emitting the light of blue in the plurality of light sources is turned on for a longer time within the time period of one frame than the light source emitting the light of red and the light source emitting the light of green.

6. The electro-optical device according to claim 5, wherein the display panel includes display pixels, and each of the display pixels includes four sub-pixels having three sub-pixels with colored layers for red, green, and blue, and a sub-pixel with a colored layer for a color which is complementary to one of red, green, and blue.

7. An electronic apparatus comprising the electro-optical device according to claim 1 as a display unit.

8. An illumination device comprising a plurality of light sources emitting light of red, green, blue, and white, wherein the chromaticity of light that is a combination of the light emitted from the plurality of light sources is adjusted to a predetermined chromaticity by changing the time for which each of the plurality of light sources is turned on within a time period of one frame.

9. An electro-optical device comprising:

a display panel in which a plurality of display pixels are arranged;

an illumination device including a first light source that emits a red light, a second light source that emits a green light, and a third light source that emits a blue light, the display panel transmitting light emitted from the illumination device, and absorbing more blue light than any other color component, wherein, within a time period of one frame, the third light source is turned on for a longer time than the first light source and the second light source.

10. The electro-optical device according to claim 9, wherein, within a time period of one frame, the first light source is turned on for a longer time than the second light source.

11. The electro-optical device according to claim 9, wherein the illumination device includes a fourth light source that emits a white light.

12. The electro-optical device according to claim 11, wherein a non-RGB illumination period in which all of the first light source, the second light source and the third light source are turned off, is set, and wherein the fourth light source is turned on during the non-RGB illumination period.

13. The electro-optical device according to claim 11, wherein the fourth light source is always turned on within a time period of one frame.

14. The electro-optical device according to claim 11, wherein a period in which two of the first light source, the second light source and the third light source are turned off, and the fourth light source is turned on.

15. An electro-optical device comprising:

a display panel in which a plurality of display pixels are arranged, each of the plurality of display pixels including a sub pixel having a red colored layer, a sub pixel having a green colored layer, a sub pixel having a blue colored layer, and a sub pixel having a colored layer for a color complementary to red;

an illumination device including a first light source that emits a red light, a second light source that emits a green light, and a third light source that emits a blue light, wherein, within a time period of one frame, the third light source is turned on for a longer time than the first light source and the second light source.

16. The electro-optical device according to claim 15 wherein, within a time period of one frame, the first light source is turned on for a longer time than the second light source.

17. The electro-optical device according to claim 15 wherein the illumination device includes a fourth light source that emits a white light.

18. The electro-optical device according to claim 17, wherein a non-RGB illumination period in which all of the first light source, the second light source and the third light source are turned off, is set, and wherein the fourth light source is turned on during the non-RGB illumination period.

19. The electro-optical device according to claim 17, wherein the fourth light source is always turned on within a time period of one frame.

20. The electro-optical device according to claim 17, wherein a period in which two of the first light source, the second light source and the third light source are turned off, and the fourth light source is turned on.

* * * * *